United States Patent [19]

Kaspar et al.

[11] 4,454,789
[45] Jun. 19, 1984

[54] DRIVE TRAIN FOR A VEHICLE

[75] Inventors: Lothar Kaspar, Wolfsburg; Ulrich Seiffert, Brunswick, both of Fed. Rep. of Germany

[73] Assignee: Volkswagenwerk Aktiengesellschaft, Fed. Rep. of Germany

[21] Appl. No.: 265,141

[22] Filed: May 19, 1981

[30] Foreign Application Priority Data

May 21, 1980 [DE] Fed. Rep. of Germany ....... 3019273

[51] Int. Cl.³ .................... B60K 41/02; F02N 17/00
[52] U.S. Cl. ..................... 74/850; 74/7 R; 74/877; 74/851; 123/179 K
[58] Field of Search ............. 74/843, 851, 854, 877, 74/850, 7 R; 192/0.07, 0.075, 0.096; 123/179 K

[56] References Cited

U.S. PATENT DOCUMENTS

| | | | |
|---|---|---|---|
| 1,771,866 | 7/1930 | Stevenson et al. | 74/850 |
| 2,237,944 | 4/1941 | Maurer | 192/0.07 |
| 2,387,891 | 10/1945 | Elkin | 74/851 |
| 2,490,604 | 12/1949 | Syrovyet et al. | 74/854 |
| 2,609,900 | 9/1952 | Neracher et al. | 74/850 |
| 2,624,211 | 1/1953 | Dunn | 74/854 |
| 2,667,952 | 2/1954 | Ainsworth | 192/0.07 |
| 2,685,651 | 8/1954 | Collins | 74/850 |
| 2,725,864 | 12/1955 | Coffey et al. | 74/850 |
| 2,803,236 | 8/1957 | Tamburello | 123/179 K |
| 2,875,633 | 3/1959 | Mayrath | 74/854 |
| 2,969,052 | 1/1961 | Randol | 123/179 K |
| 3,129,795 | 4/1964 | Goeschel et al. | 192/0.07 |
| 4,046,032 | 9/1977 | Braun et al. | 74/877 |

FOREIGN PATENT DOCUMENTS 2945304 11/1979 Fed. Rep. of Germany.

Primary Examiner—Allan D. Herrmann
Assistant Examiner—Joseph M. Rolnicki
Attorney, Agent, or Firm—Brumbaugh, Graves, Donohue & Raymond

[57] ABSTRACT

An apparatus is provided for restarting and re-engaging an internal combustion engine in a vehicle in which the engine is disengaged from the transmission and turned off when the vehicle is coasting. The engine is coupled to an automatic transmission which includes a hydraulic pump driven by the transmission input shaft that supplies fluid to the control elements of the transmission. Means are provided for actuating a starter motor to start the engine and drive the hydraulic pump, thereby powering the control elements to re-engage the engine.

1 Claim, 2 Drawing Figures

DRIVE TRAIN FOR A VEHICLE

BACKGROUND OF THE INVENTION

This invention relates to a drive train for a vehicle, and more particularly, to a drive train for restarting and recoupling an internal combustion engine in a vehicle with an automatic transmission wherein the internal combustion engine is selectively disengaged and turned off while the vehicle is coasting.

In German Patent Application No. P 29 45 304.1, there is disclosed an apparatus for actuating a servo control motor to operate a clutch disposed between the driving engine of a vehicle and the wheels when the accelerator pedal is released and the vehicle is coasting. The engine is disconnected and turned off by either cutting off the ignition current or the fuel supply only when the vehicle is coasting faster than a preset speed. When the accelerator pedal is depressed again, the engine is recoupled with the transmission whereby the momentum of the vehicle turns the engine and starts it.

In the disclosure of German Patent Application No. P 29 45 304.1, an automatic transmission for driving the vehicle has two hydraulic pumps. The first pump, a conventional hydraulic pump in an automatic transmission, is driven by the transmission input shaft. When the driving engine is stopped, however, the transmission input shaft does not turn. The hydraulic pump does not operate, and the hydraulically operated clutch cannot be engaged to recouple the engine. A secondary hydraulic pump driven by the transmission output shaft was provided to overcome this difficulty. The secondary pump operates when the vehicle is moving since it is coupled to the wheels through the transmission output shaft. It is evident that the provision of two hydraulic pumps increases the cost and complexity of an automatic transmision, however.

Accordingly, a purpose of the present invention is to provide, in a vehicle in which the driving engine is disconnected and turned off when the vehicle is coasting, a drive train for restarting and recoupling the engine that utilizes a single hydraulic pump.

SUMMARY OF THE INVENTION

In accordance with the invention, a starter motor conventionally used to start the engine when a vehicle is at a standstill is also used to restart the engine when the coasting of the vehicle terminates. The driving engine is restarted with the starter motor, so that the hydraulic pump driven by the transmission input shaft supplies fluid to the control elements of the automatic transmission. Subsequently, the forward gear of the transmission is engaged and the engine is recoupled with the wheels. A secondary hydraulic pump for engaging the clutch when the engine is stopped is eliminated.

BRIEF DESCRIPTION OF THE DRAWING

A more complete understanding of the invention and its advantages will be apparent from the following detailed description taken in conjunction with the accompanying drawing in which.

DETAILED DESCRIPTION OF THE DRAWING

Figure 1:
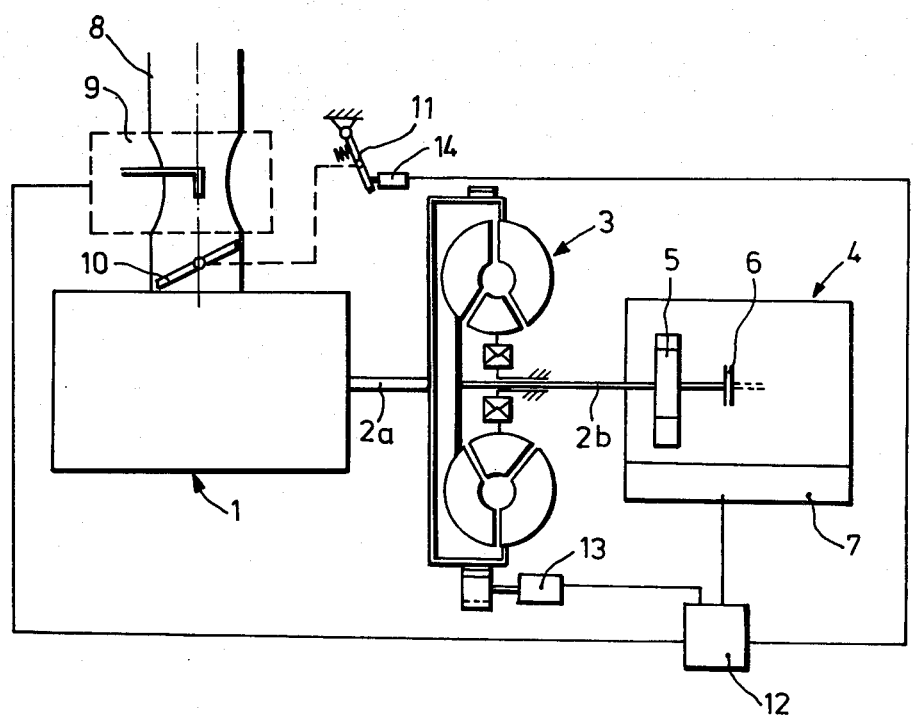
FIG. 1 is a schematic diagram of a drive unit in accord with the present invention.

The driving engine 1 of a vehicle, preferably an internal combustion engine, is coupled to an automatic transmission comprising a hydrodynamic torque convertor 3, a planetary gear train 4, and control elements for actuating the individual transmission gears. The gear train 4 includes a clutch 6 and an associated transmission control 7. A hydraulic fluid pump 5 is driven by the transmission input shaft 2b connected to the torque converter 3 coupled to the engine crankshaft 2a. The hydraulic fluid pump 5 delivers hydraulic fluid to the transmission control 7 and actuates the control elements and the clutch 6.

An intake manifold 8 connects a carburetor 9 with the engine 1. A throttle valve 10 is disposed in the intake manifold 8 and can be adjusted by an accelerator pedal 11 to control the power output of the engine 1. A starter motor 13, preferably driven by the vehicle's electrical system, is provided to start the driving engine 1. In one embodiment, the starter motor 13 turns the engine crankshaft 2a through the pump wheel of the torque converter 3.

A control instrument 12 is connected via signal lines to the carburetor 9. An accelerator pedal sensor 14 is also connected to the control instrument 12 and indicates the position of the accelerator pedal 11. The control instrument 12 also is connected to the starter motor 13 and the transmission control 7. Other sensors (not shown), indicating, for example, the position of the gear selector lever or the speed of the vehicle, can be connected to the control instrument 12.

When the accelerator pedal 11 is released, and the vehicle is coasting to reduce emission by-products or save fuel, the control device 12 sends appropriate signals to the transmission control 7 whereby the clutch 6 of the planetary gear train 4 disengages the driving engine 1 from the vehicle wheels. At the same time, the fuel supply can be cut off from the driving engine by, for example, closing an idling cut off valve associated with the carburetor. Alternatively, the ignition current can be shut off. The driving engine can be turned off while the vehicle is standing or while it is coasting.

Actuation of the accelerator pedal 11 terminates the coasting of the vehicle and sends a signal to the control unit 12 to activate the starter motor 13 and start the driving engine 1. The hydraulic pump 5 operates when the driving engine begins turning, and supplies hydraulic fluid to the transmission control 7 and the control elements of the planetary gear train 4. The transmission control 7 actuates the clutch 6 simultaneously with the activation of the starter motor 13 so that the driving engine 1 is coupled with the wheels of the vehicle.

Figure 2:
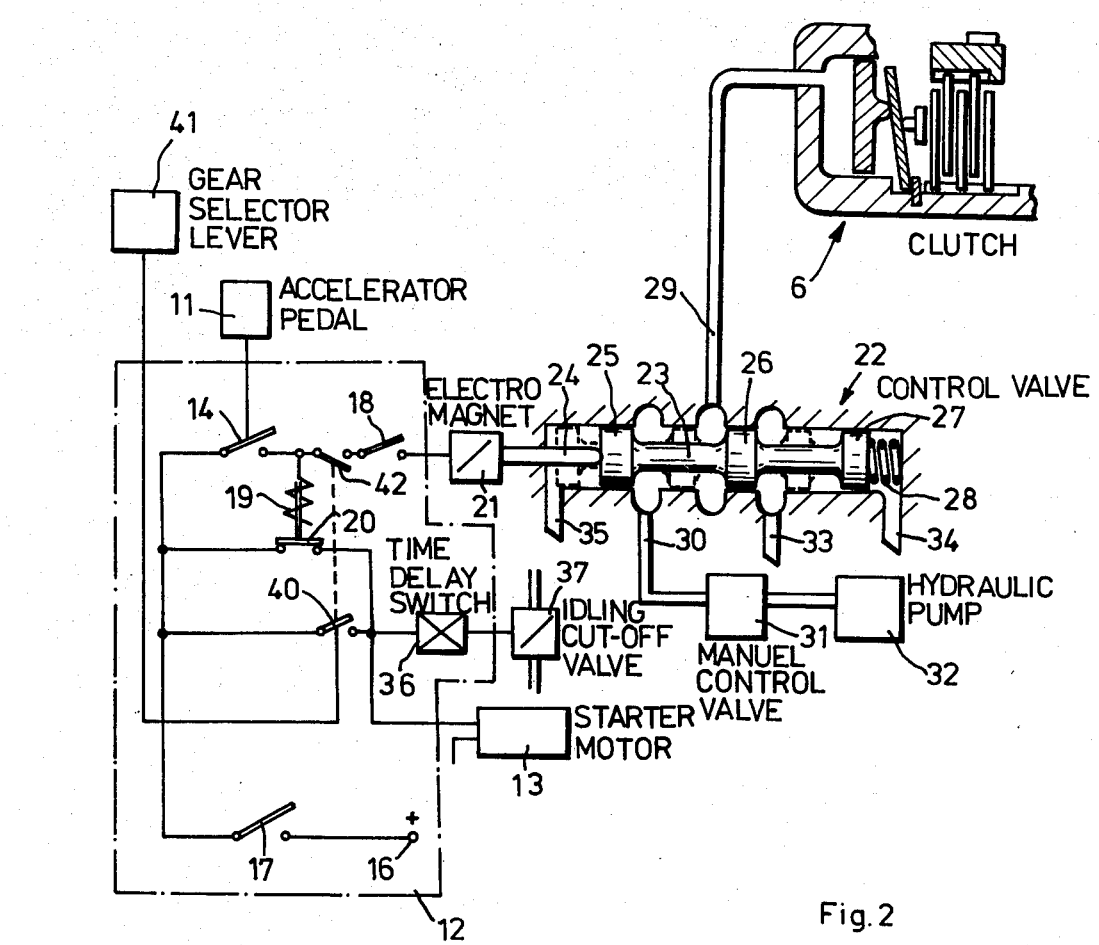
FIG. 2 is a schematic diagram of a drive unit illustrating details of the unit of FIG. 1.

In FIG. 2, reference numeral 11 designates an accelerator pedal of a vehicle. The control unit 12 of FIG. 1 includes a switch 14 associated with the accelerator pedal 11 and is open when the pedal 11 is actuated and closed when the pedal 11 is released. The starter motor 13, as indicated in FIG. 1, starts the engine by turning the pump wheel of the torque converter connected to the crankshaft 2a.

A forward clutch 6, as provided in most automatic transmissions, is actuated by hydraulic fluid from hydraulic pump 32 supplied over hydraulic lines 29 and 30. A manual control valve 31 actuated by the gear selector lever 41 is disposed in the hydraulic line 30 to control the flow of hydraulic fluid. A control valve 22, including a valve piston 23, is disposed between hydraulic lines 29 and 30. The control valve 22 selectively connects the hydraulic line 29 to either the hydraulic fluid in line 30 from the hydraulic pump 32 or to a hydraulic line 33 leading to a reservoir maintained at atmospheric pressure. A spring 28 contacting a piston collar 27 on the right-most side of the control valve 22, as seen in FIG. 2, biases the control valve 22 to the left. An electromagnet 21 is connected to the left collar 25 of the control valve 22 through a tappet 24 and controls the position of the valve piston 23. A center control collar is designated 26. Two oil drain lines 34, 35 are also associated with the end faces of the valve piston 23.

When current supplied to the electromagnet 21 is cut off, the electromagnet 21 displaces the piston valve 23 to the right, as seen in FIG. 2. The hydraulic fluid in line 30, connected to the manual control valve 31, is in fluid communication with the hydraulic fluid in line 29 leading to the clutch 6 and actuates the clutch 6. When current is supplied to the electromagnet 21, the tappet 24 is withdrawn to the left, so that the spring 28 urges the valve piston 23 to the left and assumes the position indicated by the broken lines. In the left-most position, the hydraulic fluid line 29 is connected to the drain line 33, and the clutch 6 is disengaged.

The electromagnet 21 can be driven by any suitable circuit, and can be connected to the positive pole of a vehicle battery 16. An ignition switch 17 disposed between the battery 16 and the electromagnet 21 is closed when the ignition is switched on, but is open when the ignition is switched off. A manually operable switch 18 can be provided to prevent the disengagement of the clutch 6, for example, when the vehicle is idling or the engine is used to brake the vehicle. During normal operation of the vehicle, however, the switch 18 is closed.

When the ignition is switched on, the manually operable switch 18 is closed, the accelerator pedal 11 is released and the switch 14 is closed, as during engine-braking or standing of the vehicle, current flows to the electromagnet 21 to urge the control valve 23 to the left in the manner described above, causing the disengagement of the clutch 6.

The control unit 12 includes a relay 19 with contacts 20 that are open when the relay receives current and closed when current is not supplied. The contacts 20 energize an electromagnetic valve 37, such as an idling cutoff valve, which shuts off the fuel delivered to the engine when the vehicle is coasting. A time delay switch 36 can be disposed between the relay 19 and the idling cut-off valve 37 so that the fuel is shut off only after a lapse of a predefined time period, for example, one second.

The starter motor 13 is connected in parallel to the idling cut-off valve 37 and is supplied with current to start the engine. The starter motor 13 includes means which prevent its operation when the engine is running.

In U.S. patent application of Oberpichler, Ser. NO. 250,225, filed Apr. 2, 1981, a circuit similar to the one illustrated in FIG. 2 is disclosed, but primarily used with manually operated transmissions. Just as disclosed in that patent application, a switch can be positioned in parallel to the switching contacts 20 of the relay 19 so that the contacts of that switch open only above a predefined speed of the vehicle. Such a switch insures that the engine is stopped only if the vehicle is traveling faster than the minimum speed. Below the pre-set speed, the engine remains running. A suitable speed sensor can be connected to the control unit 12 to provide information as to the speed of the vehicle. In this embodiment, the engine continues running when the vehicle is standing or slowly rolling, even if the accelerator pedal has been released and the clutch 6 has been disengaged.

Further, another switch 40 can be disposed in parallel with the switch contacts 20 which is responsive to the position of the gear selector 41 of the automatic transmission. In such an arrangement, for example, the switch is open when the normal driving gear is engaged, and closed to provide constant current to the idling cut-off valve 37 when one of the lower driving gears is engaged. In addition, another switch 42 can be connected to the electromagnet 21 which prevents the clutch 6 from disengaging when the vehicle travels over mountainous terrain or is otherwise under a load and the braking operation of the engine is desired. In this latter case, the switch is closed when the transmission gear selector lever is positioned in the drive position and open when the lever is positioned in the lower gears.

In prior art arrangements, the recoupling of the dead engine with the driving wheels is accompanied by an uncomfortable jerking motion. According to the invention, the engine is started and its speed is increased before the forward clutch 6 recouples the engine 1 to the wheels. Accordingly, the uncomfortable jerks associated with prior art devices are obviated.

While more than one embodiment of the present invention has been described in detail herein and shown in the accompanying drawing, it will be evident that further modification is possible without departing from the spirit and scope of the invention.

What is claimed is:

1. In a vehicle with an accelerator pedal, an internal combustion engine and an automatic transmission, including an input shaft, a hydrodynamic torque converter, a planetary gear train and hydraulically actuated control elements with at least one clutch for engaging the forward gears of said gear train, coasting means responsive to release of the accelerator pedal for automatically disengaging the engine from said transmission by releasing said clutch and then turning the engine off while said vehicle is coasting, and apparatus for restarting and re-engaging said engine conprising:

a hydraulic pump driven by the transmission input shaft for supplying fluid to said control elements;
    a starter motor for turning said engine; and
    means response to depression of said accelerator pedal and the forward gear selection of said transmission for actuating said starter motor to start said engine and drive said hydraulic pump to power said control elements and re-engage said engine.

* * * * *